Sept. 7, 1948.   S. WAY   2,448,561
GAS TURBINE APPARATUS.
Filed May 1, 1946
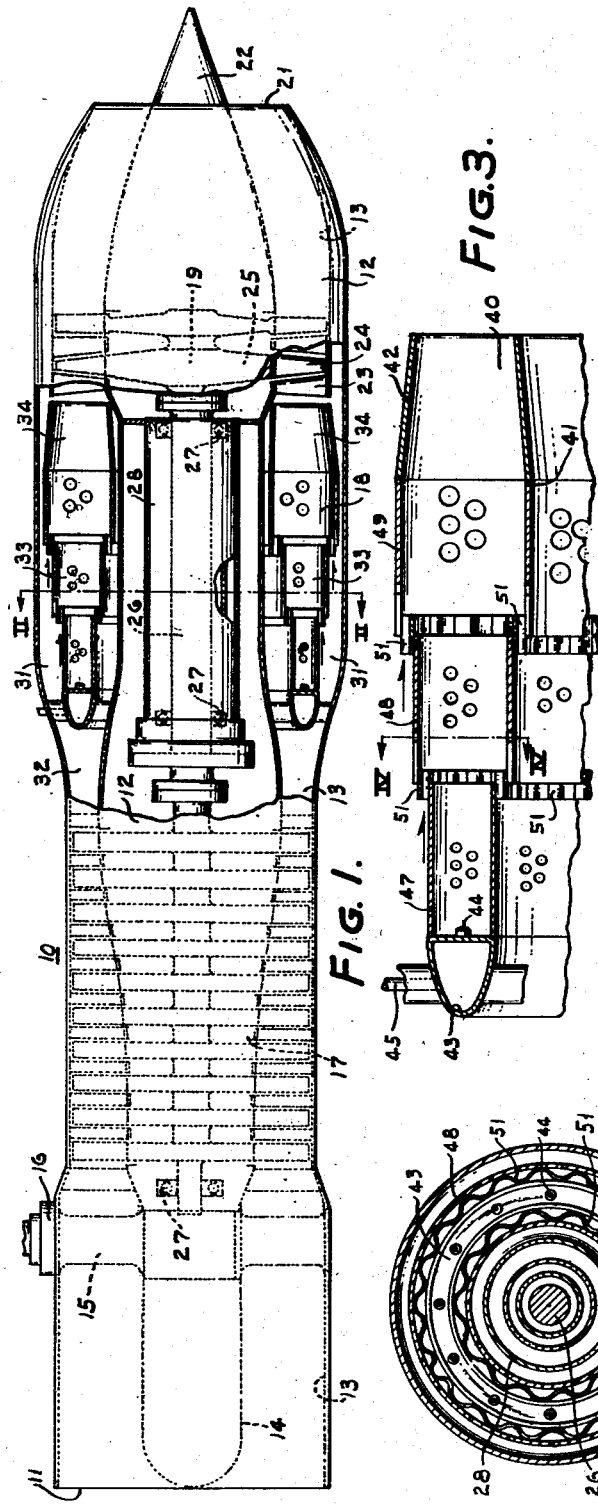
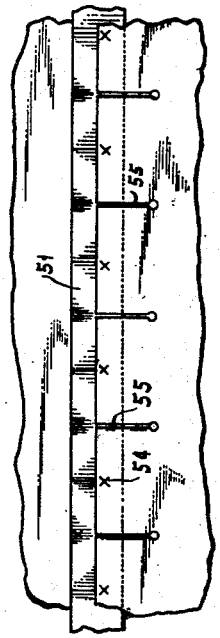
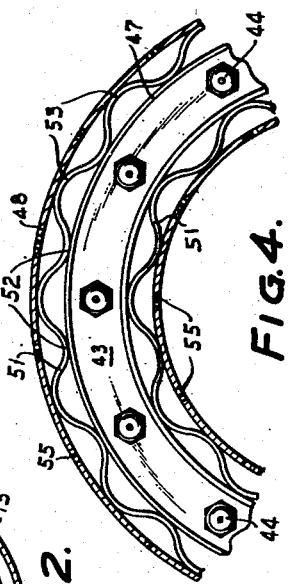
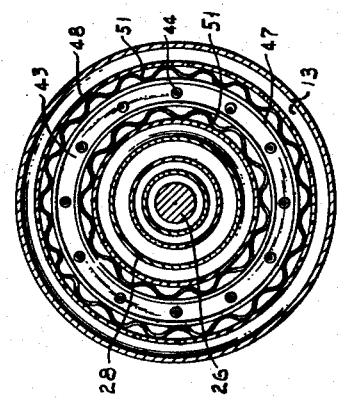
INVENTOR
STEWART WAY
BY
Ralph T. Frund
ATTORNEY Patented Sept. 7, 1948

2,448,561

UNITED STATES PATENT OFFICE 2,448,561

GAS TURBINE APPARATUS

Stewart Way, Churchill Borough, Pa., assignor to Westinghouse Electric Corporation, East Pittsburgh, Pa., a corporation of Pennsylvania Application May 1, 1946, Serial No. 666,374

3 Claims. (Cl. 263—19)

This invention relates to power plants and particularly to combustion apparatus for a gas turbine and it has for an object to provide an improved device of the character set forth.

The present invention, although not limited thereto, is particularly adapted for use in a gas turbine power plant of the type employed on aircraft to drive the propeller or electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The spent gases on leaving the turbine are discharged through a nozzle provided at the rear of the casing and may aid in propelling the aircraft.

It is imperative that the physical dimensions and weight of a plant of this character be kept at an absolute minimum, and consequently the combustion apparatus must be small requiring it to function with high velocities of flow and to realize rates of energy release of the order of $30 \times 10^6$ B. t. u. per cubic foot per hour.

If the power plant is mounted in a nacelle or built into a wing, and even when mounted in the fuselage, the frontal area of the plant must be maintained at a minimum to reduce drag through the plant, with the result that the velocities of the hot gases leaving the combustion apparatus are high and these velocities should be about 200 to 300 feet per second.

It is accordingly a further object to provide a combustion apparatus of small size which is capable of handling a large volume of air and fuel mixture and complete combustion of the fuel in a relatively small space.

A power plant of this character operates over a wide range of fuel rates since the fuel rate for peak load, as at take-off, may be as much as ten times that for idling at high elevation. Further, the combustion apparatus must be able to burn the fuel and heat the air supplied by the compressor to a peak temperature which may be 1500° F. or even higher without danger of distorting the walls or causing excessive creep or corrosion of the apparatus.

Therefore, another object of this invention is to provide combustion apparatus including an annular wall of stepped formation in which the risers are comprised by corrugated or convoluted annular members welded to the adjacent "steps" and one of the steps is slotted between the weld connections to provide for free relative expansion and contraction of the stepped structure upon changes in temperature.

Yet another object of the invention is to provide a combustion chamber wall construction wherein a corrugated separator is arranged between portions of smaller and larger diameters of adjacent sections of the wall, the separator being connected to the portion of smaller diameter and being welded to tongues on the portion of larger diameter, the tongues being provided by slits or slots between the welded connections.

A further object of the invention is to provide a combustion chamber wall of stepped formation in which the risers are comprised by strips overlapping the step below and overlapped by the step above, the two overlaps being in offset or non-overlying relation to each other, whereby the overlapped portions of the risers and associated steps may be easily secured as by welding, riveting, etc.

The pressure drop across the combustion chamber, comparing the state of two stations of equal velocity, should be kept at an absolute minimum since the pressure drop decreases the power which can be developed by the turbine driven by the hot gases discharging from the combustion apparatus.

The above-mentioned features, limitations, and requirements for the combustion apparatus of the gas turbine power plant for aircraft use apply also, but perhaps not as critically, to gas turbine power plants on small vessels of high power and speed, particularly naval craft or in any installation where space and weight are at a premium. It is, accordingly, a further object of the invention to provide an improved combustion apparatus capable of satisfying the above-mentioned limitations and requirements in a gas turbine power plant.

These and other objects are effected by the invention as will be apparent from the following description and claims taken in connection with the accompanying drawings, forming a part of this application, in which:

Fig. 1 is a side elevational view of a gas turbine power plant embodying the present invention, a portion of the outer casing and of the burner tubes being broken away to better illustrate the combustion apparatus, the novel subject matter of the application;

Fig. 2 is a sectional view taken along the line II—II of Fig. 1, looking in the direction indicated by the arrows;

Fig. 3 is an enlarged sectional view of the combustion apparatus illustrated in Fig. 1;

Fig. 4 is a transverse sectional view taken along the line IV—IV of Fig. 3, looking in the direction indicated by the arrows; and Fig. 5 is a developed plan of the structure shown in Fig. 4.

The power plant shown in Fig. 1 and generally indicated 10, is adapted to be mounted in or on the fuselage or wing of an airplane with the left or intake end 11, as viewed in this figure, pointed in the direction of flight.

The plant comprises an outer shell or casing structure 12 providing an annular air duct or passage 13 extending fore and aft with respect to the aircraft. This casing has mounted therein along its longitudinal axis a fairing cone 14 adapted to house gearing connected through a hollow guide vane 15 with auxiliaries 16, an axial-flow compressor 17, combustion apparatus generally indicated 18, a turbine 19 which drives the compressor, and a nozzle 21 defined by the casing 12 and by a tailpiece 22, the latter being mounted concentrically in the casing and cooperating with the latter to provide a propulsion jet.

Air enters at the intake end 11 and flows substantially straight through the plant, passing through the compressor 17, where it is compressed, and into the combustion apparatus 18, where it is heated. The hot gases, comprising the products of combustion and excess air heated by the combustion, on leaving the combustion apparatus, are directed by suitable guide vanes or nozzles 23 against the blades 24 of the turbine disc 25 and then are discharged through the propulsion nozzle 21 to propel the aircraft.

The present invention is not limited to the specific details or arrangement of the structure thus far described, but it is primarily concerned with the combustion apparatus which heats the compressed air supplied by the compressor without disturbing the straight-through flow of the plant, thereby permitting a design of small maximum diameter.

By reference to Fig. 1, it will be noted that the compressor and turbine rotors are interconnected by means of a shaft 26 supported in suitable bearings, indicated at 27, and enclosed by an inner casing structure, generally indicated 28, which protects the shaft and bearings from high temperatures and also defines the portion of the annular air flow passage 13 in which the combustion apparatus 18 is mounted.

In order to maintain the combustion apparatus and the outer casing structure of small maximum diameter, the combustion apparatus is divided by wall structure into an air space or spaces 31 open to the discharge end of a diffuser passage 32 leading from the compressor, and which overlap a burner space or spaces 33 open to a passage 34 leading to the turbine guide vanes 23. Atomized fuel is supplied to the forward end of the burner space or spaces which are also provided with ignition means. The dividing wall structure has openings therein to provide for entry into the burner space of compressed air from the overlapping air spaces, the entering air supporting combustion of fuel and mixing with the hot products of combustion to provide a motive fluid comprising a mixture of air and products of combustion of suitable temperature for driving the turbine.

The dividing wall structure separating the air and burner spaces may be constituted in any suitable manner, provided that it is disposed so that the air space overlaps axially the burner space or spaces and so that air may flow into the latter along the structure to enable combustion to be completed or substantially completed within the axial length of the burner spaces. In this way, the axial length of the apparatus is kept at a minimum because it does not require the division of the air stream into two distinct streams of primary and secondary air, the primary air being used to complete the combustion, with the remaining secondary air stream being mixed with the combusted gases to lower the final temperature.

Referring now to the details of construction illustrated in Figs. 3 to 5, inclusive, there is shown a combustion chamber 40, defined by inner and outer annular walls 41 and 42, respectively, and extending downstream from the nozzle manifold 43 which carries a plurality of nozzles 44 adapted to admit fuel to the upstream end of the combustion chamber from the manifold 43, the latter being supplied with fuel by the conduit 45. The inner and outer walls 41 and 42 are of identical construction except that the inner wall is of progressively decreasing diameter from the upstream to the downstream end thereof while the outer wall is of progressively increasing diameter in the same direction, this arrangement providing a combustion chamber 40 of progressively increasing cross-sectional area from its upstream end to its downstream end. Therefore, it is believed necessary to describe in detail only the outer wall 42, which comprises a series of annular sections 47, 48 and 49 joined at their adjacent terminal portions by spacer members 51 which overlap the adjacent sections of smaller diameter and are overlapped by adjacent sections of larger diameter.

The spacer members 51 are in the form of circumferentially corrugated rings whose inwardly-depressed portions 52 contact the adjacent sections of smaller diameter and whose outwardly-projecting portions 53 contact the adjacent sections of greater diameter. The spacer members are permanently secured to the adjacent terminal portions of the annular sections by suitable means, preferably by spot-welding, at a plurality of the points of contact.

As will be apparent upon reference to Fig. 3, the joined ends of adjacent sections, such as 47—48 and 48—49, do not overlap but are substantially radially aligned. If adjacent sections were overlapped a distance corresponding to the axial extent of the spacer members 51, these spacers would be covered both on the inside and the outside, with the result that it would be exceedingly difficult, if not impossible, to secure them to the associated annular sections by welding or riveting. By limiting the overlapping of each annular section to approximately fifty per cent of the axial extent of the spacer it overlaps, welding or riveting of each connection is greatly facilitated.

In order to prevent warpage of the wall structure or breakage of the connections between the spacing members and their associated annular sections, which might result if no suitable means were provided for avoiding such distortion, one of the annular members is provided with axially-extending slits or slots 55 between the weld connections or other connections 54. Preferably, the slits or slots are provided in the annular members which are downstream of the associated spacer members 51 as these sections may be as much as 800° F. cooler than the sections immediately upstream of the corresponding spacer members, and with temperature differences of this amount, means must be provided for circumferential expansion.

While the invention has been shown in but one form, it will be obvious to those skilled in the art that it is not so limited, but is susceptible of various changes and modifications without departing from the spirit thereof.

What is claimed is:

1. In a combustion chamber adapted for admission of fuel to the upstream end thereof and discharge of hot gases from the downstream end thereof, an annular wall comprising a plurality of annular sections of different sizes arranged concentrically and in order of increasing size from the upstream end toward the downstream end of said chamber with adjacent ends of the sections approximately aligned radially and with adjacent terminal portions of the sections radially spaced, and spacer members disposed in the radial spaces between adjacent terminal portions in overlapping relation to the latter.

2. In a combustion chamber, an outer annular wall of stepped construction, each of said steps comprising an annular section of materially greater diameter than the preceding section from the upstream to the downstream end of the chamber, and each riser of said stepped construction comprising a circumferentially-corrugated annular member overlapping the adjacent terminal portion of the adjacent section of smaller diameter and being overlapped by the adjacent terminal portion of the adjacent section of larger diameter, connections between a plurality of the inwardly-depressed portions of the corrugated risers and the terminal portions overlapped thereby, and connections between a plurality of the outwardly-raised portions of the corrugated risers and the terminal portions overlapping said risers, said overlapping terminal portions being slit axially intermediate said last-mentioned connections.

3. In a combustion chamber, an outer annular wall of stepped construction, each of said steps comprising an annular section of materially greater diameter than the preceding section from the upstream to the downstream end of the chamber, and each riser of said stepped construction comprising circumferentially-corrugated annular members overlapping the adjacent terminal portion of the adjacent section of smaller diameter and being overlapped by the adjacent terminal portion of the adjacent section of larger diameter, weld connections between a plurality of the inwardly-depressed portions of the corrugated risers and the terminal portions overlapped thereby, and weld connections between a plurality of the outwardly-raised portions of the corrugated risers and the terminal portions overlapping said risers, said overlapping terminal portions being slotted axially intermediate said last-mentioned weld connections.

STEWART WAY.

REFERENCES CITED

The following references are of record in the file of this patent:

UNITED STATES PATENTS

| Number | Name | Date |
|---|---|---|
| 1,311,235 | Kemp | July 29, 1919 |
| 2,268,464 | Seippel | Dec. 30, 1941 |

FOREIGN PATENTS

| Number | Country | Date |
|---|---|---|
| 539,069 | England | Aug. 27, 1941 |